(No Model.)
G. L. BARNARD.
TUBULAR COUPLING.
No. 514,055.  Patented Feb. 6, 1894.
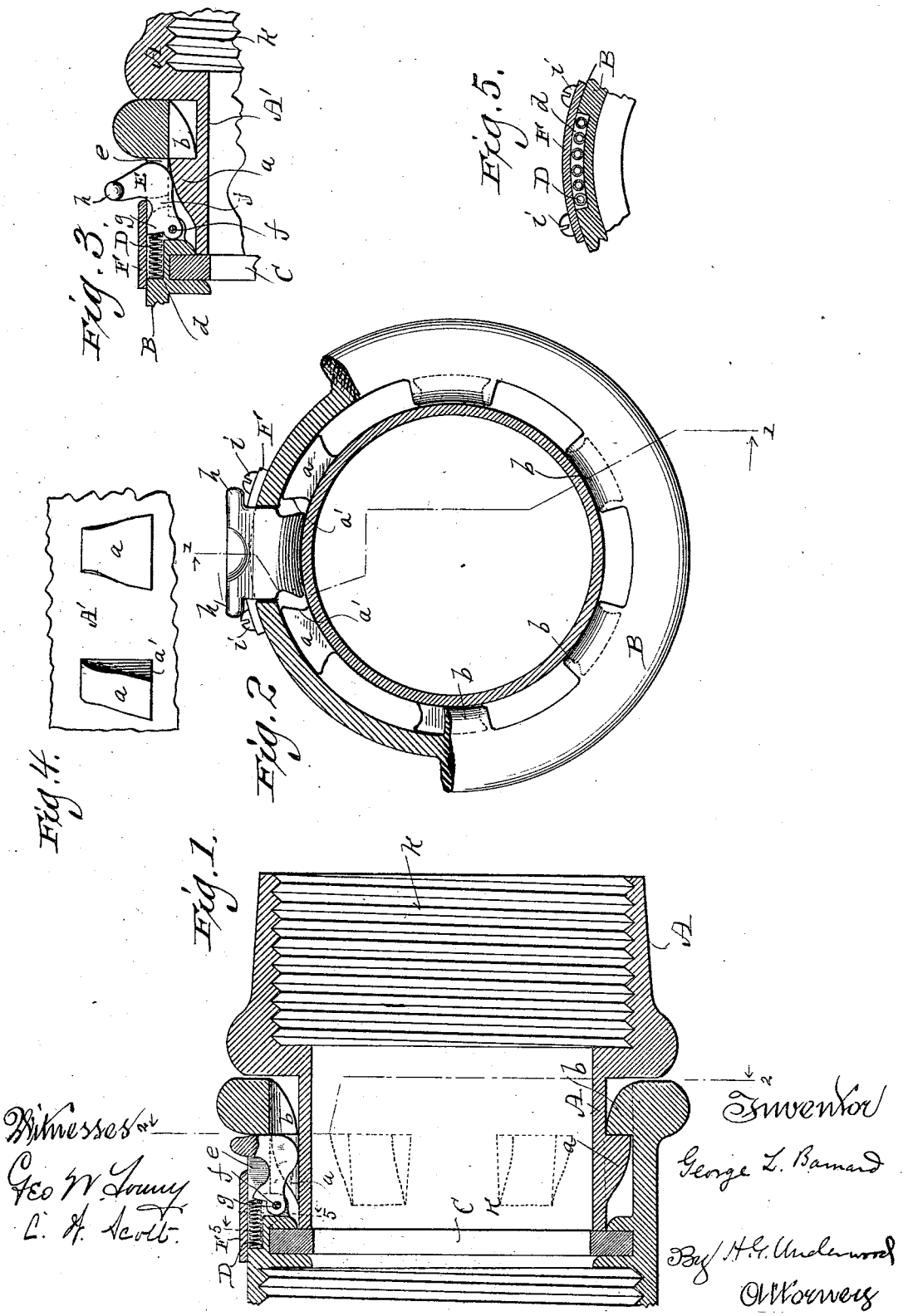
Witnesses
Geo. W. Young
C. H. Scott
Inventor
George L. Barnard
By H. G. Underwood
O. Worweg

UNITED STATES PATENT OFFICE.

GEORGE L. BARNARD, OF MILWAUKEE, WISCONSIN, ASSIGNOR, BY DIRECT AND MESNE ASSIGNMENTS, TO THE TRIUMPH MANUFACTURING COMPANY, OF SAME PLACE.

TUBULAR COUPLING.

SPECIFICATION forming part of Letters Patent No. 514,055, dated February 6, 1894.

Application filed May 18, 1893. Serial No. 474,644. (No model.)

*To all whom it may concern:*

Be it known that I, GEORGE L. BARNARD, a citizen of the United States, and a resident of Milwaukee, in the county of Milwaukee, and in the State of Wisconsin, have invented certain new and useful Improvements in Tubular Couplings; and I do hereby declare that the following is a full, clear, and exact description thereof.

My invention relates to tubular couplings, especially such as hose-couplings, and consists in certain peculiarities of construction and combinations of parts, as will be fully set forth hereinafter, and subsequently claimed.

In the drawings: Figure 1 is a vertical longitudinal section through my improved device, on the line 1—1 of Fig. 2. Fig. 2 is a transverse section through the same, on the line 2—2 of Fig. 1. Fig. 3 is a section showing practically the same parts as in Fig. 2, but in a different position. Fig. 4 is a detail of the lugs on one of the members of my device. Fig. 5 is a detail section on the line 5—5 of Fig. 1.

Primarily my said coupling consists of two members A and B. The member A is formed with an inset cylindrical portion A′ having a series of lugs $a$ $a$ all around its outer periphery. The member B is provided on its inner peripheral edge with a series of lugs $b$ $b$ of such size as to just slip past or between the lugs $a$ $a$ of the other member, when the cylinder A′ is inserted within the member B, after which the parts are turned so as to bring the lugs $a$ beneath the lugs $b$ as best shown in section in the lower part of Fig. 1.

C is an elastic or yielding gasket, preferably of rubber, fitting in an internal annular groove $c$ in the member B and so located that the edge of the cylinder A′ will press against it.

The outer periphery of the member B is grooved or cut out, as shown at $d$, for the reception of a battery of springs D, and beyond this, toward the end of the said member, cut through as shown at $e$, for the reception of the latch E, which is pivoted in place, as shown at $f$ and provided with a shoulder $g$ bearing against the springs D. Said latch is further provided with prongs or catch-pieces $h$ $h$ for convenience in raising it, or drawing it outward.

F is a plate secured to the outside of the member B to cover the groove $d$ and keep the springs D in place, being secured to said member by screws $i$ $i$, so as to be readily detachable. The latch is further provided with a slot $j$ (shown in dotted lines in Fig. 3) for the release of any dirt or other foreign substance which may get between said latch and the plate F.

The members A and B are shown provided with corrugations $k$ $k$ on their inner peripheries for the better security of the sections of hose attached thereto, in the ordinary manner, which corrugations may be spirally arranged, as shown, or otherwise.

The operation of my device will be readily understood from the foregoing description of its construction taken in connection with the accompanying drawings. When the two members are put together, as already described, the lugs $a$ and $b$ slip past each other and the latch E is raised, against the force of the springs D, rising up on one of the lugs $a$ as shown in Fig. 3. Then the members A and B are turned slightly, as described, so that the lugs $a$ and $b$ will be in line with each other, with their flat faces in contact, as shown in Fig. 1, and the pressure of the springs D will force the latch E down between two adjacent lugs $a$ in the position shown in Fig. 1, forming an absolute lock, and the two members will be thereby absolutely guarded against any accidental separation, as it will be necessary to pull the latch E outward, against the resistance of the springs D, and to turn the said members, or one of them, at the same time, till these parts are again in the relative positions shown in Fig. 3, before the two members A and B can be separated.

While especially designed for use in connection with sections of hose, it is obvious that my described invention is applicable to any other style of tubular coupling.

It will be noted that the side edges of the described lugs $a$ are of ogee shape and considerably undercut at the base or flat surface $a'$ of said lugs, and that the inner face and side edges of the latch E are correspondingly shaped, so that, when the said latch is locked, by the spring D, between two adjacent lugs a, if the members A and B are turned the said latch E will catch under the edge of the nearest lug a, and this will prevent any possible lifting outward or freeing of said latch consequent upon said lateral movement of either of said members A and B.

Having thus described my invention, what I claim as new, and desire to secure by Letters Patent, is—

1. In a tubular-coupling, the combination with two members, one telescoping into the other, one member being formed with an inset cylindrical portion provided with a series of lugs around its outer periphery, and the other member with a corresponding series of lugs around its inner peripheral edge, and the lugs on the two members being at such distances apart as to slide past or between each other when the members are being united and then to be held in line and interlocked as said members are adjusted, of a spring controlled latch on one member adapted to ride up on one of the lugs of the other member, and then to be locked between two of said lugs, in the union and adjustment of the said two members, substantially as set forth.

2. In a tubular coupling, the combination with two members, one telescoping into the other, one member being formed with an inset cylindrical portion provided with a series of lugs around its outer periphery, said lugs being outwardly tapered, and having ogee-shaped and undercut side edges and flat rear surfaces, and the other member being provided with a series of lugs having flat rear surfaces, and the lugs on the two members being at such distances apart as to slide past or between each other when the members are being united, of a spring controlled latch on one member of a size to fit between the lugs on the other member and having its side edges shaped to correspond with the ogee-shaped and undercut side edges of the lugs on said other member, substantially as and for the purpose set forth.

In testimony that I claim the foregoing I have hereunto set my hand, at Milwaukee, in the county of Milwaukee and State of Wisconsin, in the presence of two witnesses.

GEORGE L. BARNARD.

Witnesses:
H. G. UNDERWOOD,
HENRY DANKERT.